US012699891B2

(12) United States Patent
Hafner

(10) Patent No.: US 12,699,891 B2
(45) Date of Patent: Aug. 4, 2026

(54) BATCHED REINFORCEMENT LEARNING

(71) Applicant: GOOGLE LLC, Mountain View, CA (US)

(72) Inventor: Danijar Hafner, London (GB)

(73) Assignee: Google LLC, Mountain View, CA (US)

(*) Notice: Subject to any disclaimer, the term of this patent is extended or adjusted under 35 U.S.C. 154(b) by 651 days.

(21) Appl. No.: 16/617,461

(22) PCT Filed: Aug. 24, 2018

(86) PCT No.: PCT/US2018/047998
§ 371 (c)(1),
(2) Date: Nov. 26, 2019

(87) PCT Pub. No.: WO2019/040901
PCT Pub. Date: Feb. 28, 2019

(65) Prior Publication Data
US 2020/0234117 A1 Jul. 23, 2020

Related U.S. Application Data

(60) Provisional application No. 62/550,513, filed on Aug. 25, 2017.

(51) Int. Cl.
*G06N 3/08* (2023.01)
*G06F 16/901* (2019.01)
*G06N 5/04* (2023.01)

(52) U.S. Cl.
CPC ........... *G06N 3/08* (2013.01); *G06F 16/9024* (2019.01); *G06N 5/04* (2013.01)

(58) Field of Classification Search
CPC ........ G06N 3/08; G06N 3/0454; G06N 20/00; G06N 5/04; G06F 16/9024; G06F 9/485; G06F 9/4418; G06F 1/3228; G06F 1/329
See application file for complete search history.

(56) References Cited

U.S. PATENT DOCUMENTS

2017/0032245 A1    2/2017 Osband et al.
2017/0132513 A1*   5/2017 Yu ......................... G06F 9/5038

FOREIGN PATENT DOCUMENTS

CN        106205126 A  * 12/2016
CN        106950969 A    7/2017

OTHER PUBLICATIONS

Yuandon Tian et al.; ELF: An Extensive, Lightweight and Flexible Research Platform for Real-time Strategy Games. Version 1; 14 pages; retrieved on May 31, 2022 (Jul. 4, 2017).*

(Continued)

*Primary Examiner* — S. Sough
(74) *Attorney, Agent, or Firm* — Fish & Richardson P.C.

(57) ABSTRACT

Methods, systems, and apparatus, including computer programs encoded on a computer storage medium, for batched reinforcement learning. For example, the batched reinforcement learning techniques can be used to determine a control policy for a robot in simulation and the control policy can then be used to control the robot in the real world. In one aspect, a method includes obtaining a plurality of current observations, each current observation characterizing a current state of a respective environment replica; processing the current observations in parallel using the action selection neural network in accordance with current values of the network parameters to generate an action batch; obtaining a transition tuple batch including a respective transition tuple for each of the environment replicas, the respective transition tuple for each environment replica including: (i) a subsequent observation and (ii) a reward; and training the action selection neural network on the batch of transition tuples.

15 Claims, 3 Drawing Sheets

(56) References Cited

OTHER PUBLICATIONS

Lei Tai et al.; A Survey of Deep Network Solutions for Learning Control in Robotics: From Reinforcement to Imitation; Journal of Class files; 19 pages; retrieved on Jun. 27, 2022 (Year: 2015).*

Siao-Lei Ma et al.; Translated CN 106205126-A; 20 pages (Year: 2016).*

Abadi et al., "TensorFlow: Large-Scale Machine Learning on Heterogeneous Distributed Systems", arXiv:1603.04467v2, Mar. 2016, 19 pages.

Babaeizadeh et al., "Reinforcement Learning through Asynchronous Advantage Actor-Critic on a GPU", arXiv:1611.06256, 12 pages, (Mar. 2, 2017).

Brockman et al., "OpenAI Gym", arXiv:1606.01540v1, Jun. 2016, 4 pages.

Dalcin, "MPI for Python: Python Bindings for MPI", https://github.com/mpi4py/mpi4py, 2017, 2 pages.

Duan et al., "Benchmarking Deep Reinforcement Learning for Continuous Control", International Conference on Machine Learning, 2016, pp. 1329-1338.

Hafner et al., "TensorFlow Agents: Efficient Batched Reinforcement Learning in TensorFlow", arXiv:1709.02878v2, Oct. 2018, 8 pages.

Hahnloser et al., "Digital selection and analogue amplification coexist in a cortex-inspired silicon circuit", Nature, 2000, 405(6789):947.

Heess et al., "Emergence of Locomotion Behaviours in Rich Enviroments", arXiv:1707.02286v2, Jul. 2017, 14 pages.

International Search Report and Written Opinion in International Application No. PCT/US2018/047998, dated Nov. 21, 2018, 17 pages.

Kingma et al., "ADAM: A method for stochastic optimization", arXiv:1412.6980v9, Jan. 2017, 15 pages.

Mnih et al., "Asynchronous Methods for Deep Reinforcement Learning", International Conference on Machine Learning, 2016, pp. 1928-1937.

PCT International Preliminary Report on Patentability in International Application No. PCT/US2018/047998, dated Feb. 25, 2020, 11 pages.

Schulman et al., "Proximal Policy Optimization Algorithms", arXiv:1707.06347v2, Aug. 2017, 12 pages.

Schulman, "Modular rl: Implementation of trpo and related algorithms", https:github.com/joschu/modular_rl, 2 pages.

Sidor et al., "OpenAI baselines: High-Quality implementations of reinforcement learning algorithms", https:github.com/openai/baselines, 2017, 5 pages.

Tian et al., "ELF: An Extensive, Lightweight and Flexible Research Platform for Real-time Strategy Games", Advances in Neural Information Processing Systems, 2017, 11 pages.

Todorov et al., "MuJoCo: A physics engine for model based control", International Conference on Intelligent Robots and Systems, Oct. 2012, 8 pages.

Williams, "Simple Statistical Gradient Following Algorithms for Connectionist Reinforcement Learning", Machine Learning, 1992, 8:229-256.

EP Office Action in European Application No. 18765341.5, dated Jul. 8, 2021, 10 pages.

IN Office Action in Indian Application No. 201927047402, dated Apr. 12, 2021, 7 pages (with English translation).

Office Action in Chinese Appln. No. 201880038408.4, dated Apr. 5, 2023, 31 pages (with EN translation).

Office Action in Chinese Appln. No. 201880038408.4, mailed on Feb. 3, 2024, 23 pages (with English translation).

* cited by examiner

Obtain observation
batch
202

Process observations
in observation batch
204

Obtain transition tuple
batch
206

Train action selection
neural network
208

200

Initialize environment
replicas in separate
processes
302

Receive observations
from processes
304

Execute inference
subgraph
306

Provide actions to
processes
308

Obtain subsequent
observations and
rewards from
processes
310

Execute training
subgraph
312

300

BATCHED REINFORCEMENT LEARNING

CROSS-REFERENCE TO RELATED APPLICATIONS

This application claims the benefit under 35 U.S.C. § 119(e) of U.S. Patent Application No. 62/550,513 entitled "BATCHED TRAINING OF ACTION SELECTION NEURAL NETWORKS", filed Aug. 25, 2017, which is incorporated herein by reference in its entirety.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that selects actions to be performed by an agent interacting with an environment. More specifically, this specification describes a batched reinforcement learning technique that allows a neural network that is used to select the actions to be performed by the agent to be trained in less time and in a more computationally efficient manner. Techniques described in this specification are particularly suited for being performed on computing apparatus having multiple CPU cores and/or hardware accelerators such as graphics processing units (GPUs) and/or tensor processing units (TPUs). Additionally, techniques described in this specification are particularly suited for being used to train neural networks that are then used to control robots (or other mechanical agents). In particular, using the described techniques, a control policy for a robot, i.e., a policy that controls the robot by selecting actions using the neural network, can be learned in simulation and then later applied to a real-world environment.

Particular embodiments of the subject matter described in this specification can be implemented so as to realize one or more of the following advantages.

Implementations of the described system facilitate improved training of action selection neural networks. In particular, by simulating multiple environment replicas in parallel and performing the neural network inferences required to select an action in parallel as described in this specification, the computational efficiency of the training process is improved, and parallelization on multiple CPU cores can be leveraged. Additionally, techniques described in this specification can allow a control policy for a robot to be learned more efficiently in simulation and can result in a higher-performing robot when the learned policies are applied to the real-world.

More specifically, reinforcement learning techniques generally involve repeatedly performing two steps: (1) causing an agent to interact with the environment in order to collect training data, i.e., transition tuples, for training the action selection neural network and (2) training the action selection neural network on the collected transition tuples. The performance of conventional reinforcement learning techniques is bottlenecked by the time and computational resources required to collect the transition tuples from the environment that are then used to train the neural network. That is, collecting transition tuples requires a larger amount of time and a larger amount of computational resources than does training the network on the collected transition tuples and therefore slows down and decreases the computational efficiency of the training process.

The training data collection step in turn includes two phases that are both time and resource intensive: (1) acting in the environment, i.e., causing the agent to perform an action, observing the effect of performing the action on the environment, and generating corresponding training data, and (2) performing neural network inference to select an action that will be performed by the agent.

The described systems alleviate the bottleneck and reduce the computational resources, e.g., time, computing power, or both, required to train the neural network by parallelizing these two time intensive phases. In particular, the described systems allow for both (i) performing neural network inference to select an action for multiple environment replicas in parallel and (ii) acting in the environment in parallel for each of the multiple environment replicas. As a result, the amount of training time and computational resources required to train an action selection neural network are drastically reduced relative to conventional techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
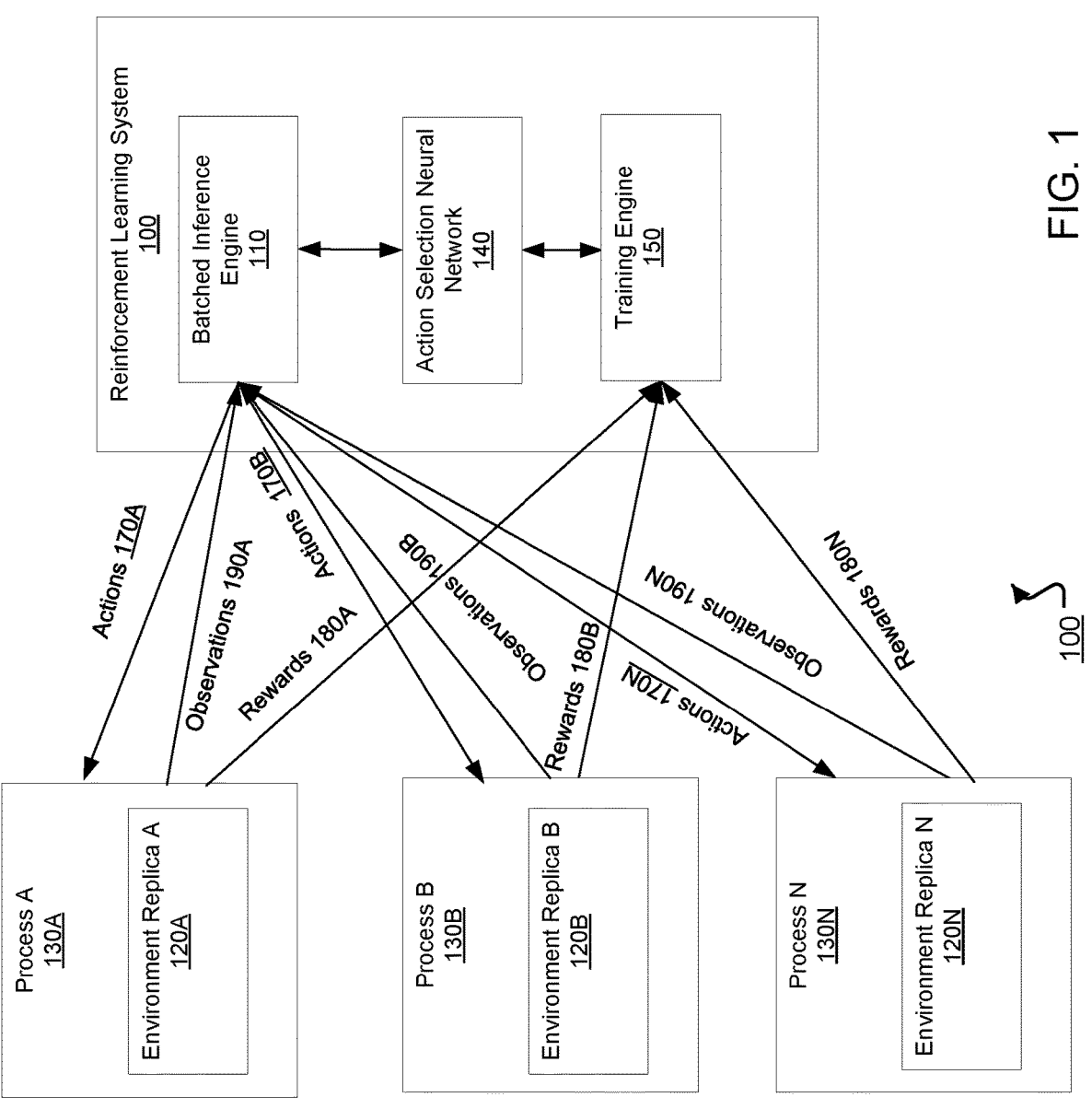
FIG. 1 is a block diagram of an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 trains an action selection neural network 140 that is used to select actions to be performed by an agent interacting with an environment at each of multiple time steps in order to cause the agent to perform a specified task.

At each time step, the system 100 receives data characterizing the current state of the environment, e.g., an image of the environment, and selects an action to be performed by the agent in response to the received data using the action selection neural network 140. Data characterizing a state of the environment will be referred to in this specification as an observation. At each time step, the state of the environment at the time step (as characterized by the observation) depends on the state of the environment at the previous time step and the action performed by the agent at the previous time step.

At each time step, the agent may receive (or the environment may generate) a reward based on the current state of the environment and the action of the agent at the time step. In general, the reward is a numerical value and can be based on any event or aspect of the environment. For example, the reward may indicate whether the agent has accomplished a task (e.g., navigating to a target location in the environment) or the progress of the agent towards accomplishing a task.

Generally, the environment is a simulated environment and the agent is implemented as one or more computer programs interacting with the simulated environment. For example, the environment may be a simulated version of a real-world environment and the agent is a simulated version of a mechanical agent interacting with the real-world environment. For example, the agent may be a simulated version of a robot interacting with the environment to accomplish a specific task, e.g., navigating to a particular location in the environment, locating a particular object in the environment, or moving an object to a particular location. As another example, the agent may be a simulated version of an autonomous or semi-autonomous vehicle navigating through a simulated version of a real-world environment, e.g., a motion simulation environment, e.g., a driving simulation or a flight simulation, to complete a specified task, e.g., to navigate to a particular location while satisfying objectives for safety or passenger comfort. In these examples, the actions may be control inputs to control the robot or the autonomous vehicle. For example, in the case of a robot, the inputs may include torques to control the joints of the robot.

In some cases, the observations are images of the simulated environment, sensor data captured by simulated sensors of the simulated agent, or other high-dimensional data. In other cases, the observations are lower-dimensional features derived from the high-dimensional data by another system.

To select an action to be performed by the agent in response to a given observation, the system 100 processes an input that includes the given observation using the action selection neural network 140 to generate a network output for the observation and then selects an action using the network output.

In some cases, the action selection neural network 140 generates a network output that includes, for each action of a set of possible actions that can be performed by the agent, a respective Q-value, i.e., an estimate of a return received if the reinforcement learning agent performs the action in response to the observation. In these cases, the system 100 can select the action having the highest Q value or can select the highest Q value with probability $1-\varepsilon$ and a random action with probability $\varepsilon$.

In some other cases, the network output defines a likelihood distribution over the actions in the set of possible actions. For example, when the set of actions is fine, the network output can include a respective likelihood for each action in the set. When the set of actions is continuous, the network output can include parameters of a distribution over the set of actions, e.g., the mean and the variance. In these cases, the system 100 can select an action by sampling an action from the likelihood distribution.

In yet other cases, the network output identifies an action from the set of possible actions. For example, when the actions are points in a continuous action space, the action can be a point in the space. In these cases, the system 100 can select an action by selecting the identified action or by adding noise to the identified action and selecting the noisy action.

To allow the neural network 140 to effectively be used to select actions to be performed by the agent, i.e., to be used to cause the agent to successfully complete the specified task, the system 100 trains the neural network 140 to update the values of the parameters of the neural network.

Once the neural network 140 has been trained, the system 100 can use the trained neural network to select actions to be performed by the agent, can provide data specifying the trained neural network to another system, or can use the trained neural network to select actions to be performed by a different agent interacting with a different environment.

In a particular example, when the environment is a simulated version of a real-world environment and the agent is a simulated version of a real-world agent, the system 100 can use the trained neural network (or the trained neural network after the trained parameter values have been fine-tuned) to select actions to be performed by the real-world agent interacting with the real-world environment to perform the specified task. That is, the system 100 can train the action selection neural network 140 to learn a control policy for a robot in simulation and can then use or provide the trained action selection neural network 140 for use in controlling a robot interacting with a real-world environment. In this context, a control policy refers to selecting actions to be performed by the robot using outputs generated by the action selection neural network 140. As the action selection neural network 140 is trained, the control policy is improved, i.e., due to changes in the network parameter values causing the robot to exhibit improved performance on the specified task.

In particular, the system 100 trains the neural network 140 by performing an iterative training process that makes use of multiple environment replicas 120A-N. Each environment replica is an instance of the environment that is identical to each other replica but that may at any given time be in a different state than others of the replicas, i.e., as a result of the agent performing different actions, as a result of the replicas being initialized into different states, or both. For example, the environment replicas may each be an instance of a simulated environment maintained in a particular platform, e.g., DeepMind Lab or OpenAI Gym.

Each environment replica 120A-N is maintained in a separate process 130A-N. By maintaining the replicas in separate processes, the system 100 allows each environment replica to operate independently without being limited by a global interpreter lock or any other thread synchronization mechanisms. For example, each process 130A-N may launch and maintain an independent instance of the same environment within the particular platform. By spawning a separate process for each environment, all available CPU cores can step environments in parallel. When training on GPUs, the system may switch between full load on the CPUs and the GPUs. This phase could be parallelized by introducing an action lag so that the environments can step together with the algorithm.

During the training process, the system 100 repeatedly obtains observations 190A-N and rewards 180A-N from the processes maintaining each of the environment replicas, uses the action selection neural network 140 to select an action to be performed by the corresponding agent in response to each observation, and provides selected actions 170A-N to the corresponding processes. The system 100 also uses the rewards, the selected actions, and the observations to train the action selection neural network 140.

In particular, the reinforcement learning system 100 includes a batched inference engine 110 and a training engine 150.

At each iteration of the training process, the batched inference engine 110 receives a respective observation from each of the processes 130A-N. Each observation characterizes the current state of the environment replica maintained by the process from which the observation is received. The batched inference engine 110 then generates an observation batch that includes each of the observations received at the iteration and processes the observations in the batch in parallel using the action selection neural network 140 and in accordance with current values of the network parameters to generate an action batch that includes, for each environment replica, a respective action to be performed by the agent in response to the current observation characterizing the current state of the environment replica. That is, the action selection neural network 140 generates a network output for each observation in parallel and the batched inference engine 110 selects a respective action from each network output as described above. Thus, the system 100 parallelizes the neural network inference at each iteration of the training process, i.e., such that actions are selected in parallel for each environment replica. Parallelizing the neural network inference to produce a batch of actions from a batch of observations allows leveraging of an internal threadpool of the batched inference engine 110, e.g. a TensorFlow session, or hardware accelerators such as Graphics Processing Units and/or Tensor Processing Units.

The batched inference engine 110 then provides the action for each environment replica to the process 130A-N that maintains the environment replica. Each process causes the agent to perform the corresponding action in parallel and provides a respective subsequent observation and a respective reward to the reinforcement learning system 100. The subsequent observation is an observation characterizing a subsequent state that the environment replica transitioned into as a result of the agent performing the action for the environment replica in the action batch and the reward is a reward generated as a result of the environment replica transitioning into the subsequent state. Thus, the system 100 parallelizes acting in the environment across the environment replicas at each iteration of the training process.

The training engine 150 generates a training tuple batch that includes a respective training tuple for each environment replica. The training tuple for a given environment replica generally includes, in addition to the current observation for the environment replica at the iteration and the selected action for the environment replica at the iteration, at least the subsequent observation for the environment replica at the iteration and the reward for the environment replica at the iteration.

The training engine 150 then trains the action selection neural network on the training tuple batch to update the current values of the network parameters using a reinforcement learning technique. The reinforcement learning technique can be any technique that is appropriate for the action selection neural network, i.e., that can be employed to train a neural network that generates an output of the kind that is generated by the action selection neural network 140, and can be either an on-policy or an off-policy technique. Examples of reinforcement learning techniques that can be used include a proximal policy optimization (PPO) algorithm, a deep deterministic policy gradients (DDPG) algorithm, an asynchronous actor-critic (A3C) algorithm, a deep Q-networks (DQN) algorithm, and a Double DQN algorithm.

This completes an iteration of the iterative training process. The reinforcement learning system 100 can repeatedly perform iterations of this training process to continue to update the values of the network parameters.

As can be seen from the description above and as will be described in more detail below, at each iteration of the training process, the system 100 parallelizes the two phases that typically serve as a bottleneck on conventional reinforcement learning processes: processing inputs using the action selection neural network 140 to select actions and acting in the environment to collect training tuples. This allows the system 100 to train the action selection neural network 140 to be able to be used to achieve high quality agent performance on a specified task in less time and while consuming fewer computational resources than conventional systems.

In some implementations, the reinforcement learning system 100 executes the inference and training of the action selection neural network 140 in a framework that represents neural network operations as a computational graph. In particular, nodes in the graph represent operations and edges represent the flow of input and output data of the operations. An example of such a framework is the TensorFlow framework described in M. Abadi, A. Agarwal, P. Barham, E. Brevdo, Z. Chen, C. Citro, G. S. Corrado, A. Davis, J. Dean, M. Devin, et al. Tensorflow: Large-scale machine learning on heterogeneous distributed systems. arXiv preprint arXiv: 1603.04467, 2016. In such a framework, each operation is assigned to a respective device that is managed by the system 100 and the training of the action selection neural network 140 is performed by executing the computational graph, i.e., by causing the devices to execute their respective assigned operations. The hardware devices are generally heterogeneous, and can include any appropriate hardware device, e.g., a combination of any of, CPUs, GPUs, ASICs or other special-purpose hardware, FPGAs, and so on.

In these implementations, the system can implement the operations performed by the batched inference engine 110 and the training engine 150 as different subgraphs of a computational graph. For example, the operations performed by the batched inference engine 110 can be implemented as an inference subgraph of the computational graph and the operations performed by the training engine 150 can be implemented as a training subgraph of the computational graph. Training the neural network using computational graphs is described in more detail below with reference to FIG. 3.

Figure 2:
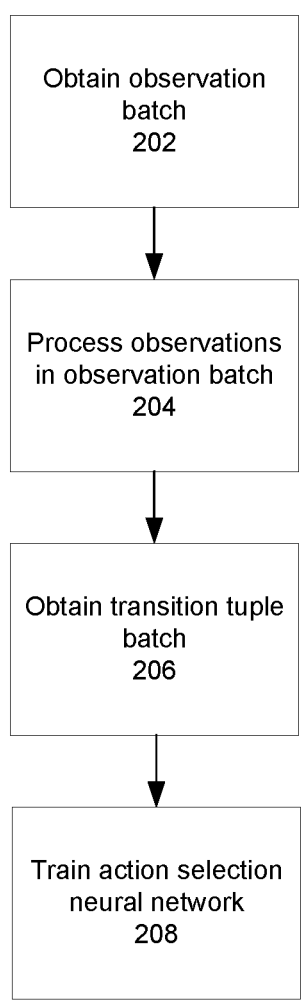
FIG. 2 is a flow diagram of an example process for batched reinforcement learning.

FIG. 2 is a flow diagram of an example process for batched reinforcement learning. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system can repeatedly perform the process 200 to train the action selection neural network. That is, the process 200 corresponds to an iteration of the iterative training process referenced above.

The system obtains an observation batch (step 202). The observation batch includes multiple current observations, with each current observation characterizing a current state of a different environment replica.

The system processes the observations in the observation batch using an action selection neural network to generate an action batch (step 204). The action batch includes a respective action for each environment replica that was generated based on the observation received from the environment replica. In particular, the system processes the observation in the observation batch in parallel using the action selection neural network generate a batch of network outputs and then selects a respective action using each network output.

The system obtains a transition tuple batch (step 206). In particular, the system provides each of the respective actions in the action batch to the process that maintains the environment replica corresponding to the action to cause the environment replicas to transition into the respective subsequent states in parallel and obtains, from each of the processes, the subsequent observation and the reward for the environment replica maintained inside of the process. After the subsequent observation and the reward have been obtained from all of the processes, the system generates the transition tuple batch from the data obtained from the processes.

To ensure the effectiveness of the training process, the system can constrain each of the processes maintaining the environment replica to only step the environment replica maintained by the environment replica a single time in response to a given action provided by the system. That is, the system instructs each process to cause the agent to act to cause a single transition from one state into another and then to freeze the environment replica so no further transitions occur until another action is received from the system.

The system trains the action selection neural network on the transition tuple batch (step 208). That is, the system performs an iteration of the reinforcement learning technique described above on the transition tuple batch to update the values of the network parameters.

Figure 3:
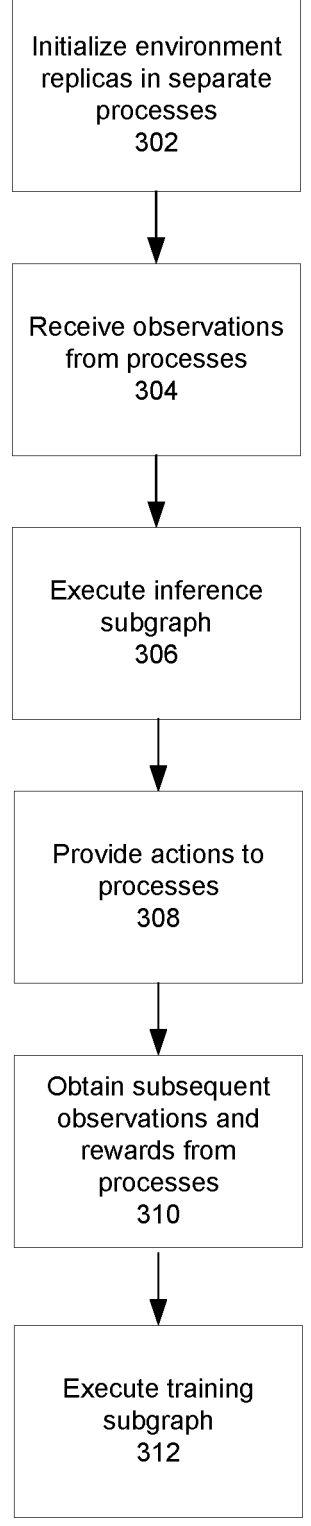
FIG. 3 is a flow diagram of an example process for batched reinforcement learning using computational graphs.

FIG. 3 is a flow diagram of an example process for batched reinforcement learning using computational graphs. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system initializes multiple environment replicas in separate processes (step 302). That is, each environment replica is initialized in a separate process from each other environment replica. As described above, each environment replica is the same environment but potentially initialized in a different initial state, e.g., a randomly selected initial state, from the other environment. For example, the system can spawn N new processes and instantiate a separate environment replica in each of the N processes. If the processes have already been spawned, the system can perform a reset operation (that can be represented as a node in the computational graph) that causes each process to re-initialize the environment maintained by the process into a respective initial state.

The system can then repeat steps 304-312 of the process 300 until the training episode is complete. For example, the system can repeat the steps for a fixed number of iterations or until some other termination criterion occurs in the environment, e.g., a task is completed by the agent in one or more of the environment replicas.

The system receives a respective observation from each process (step 304). Each observation is an observation characterizing the current state of the environment replica that is maintained within the process. Because each environment replica may have been initialized in a different state and because different actions can be selected for different environments, each environment replica may be in a different state from any other environment replica at any given time even though the same number of actions have been performed by the agent in each environment replica.

The system executes an inference subgraph of a computational graph to select a respective action for each environment replica (step 306). In particular, the inference subgraph includes a node that generates an observation batch from the received observations. An observation batch is a single tensor that is a combination of, e.g., a concatenation of, the observations received from the processes. The inference subgraph also includes a collection of nodes that represent a forward pass of the action selection neural network performed on the observation batch tensor to generate a respective network output for each observation. The inference subgraph also includes a node that selects a respective action for each environment replica using the network output for the observation that was received from the environment replica, i.e., as described above with reference to FIG. 1.

The system provides each action to the corresponding process (step 308) and obtains subsequent observations and rewards from the processes (step 310). That is, the system provides the action that was selected for a given environment replica to the process in which the given environment replica is maintained. The process, in turn, causes the agent to perform the selected action to cause the environment to change state and provides the resulting reward and subsequent observation to the system. The system then obtains, from each process, a reward and subsequent observation generated as a result of the agent performing the provided action.

In particular, the system can provide the action to the corresponding process by executing a node in the computational graph that represents an operation that receives a batch of actions as input, issues a respective call in parallel to each of the external processes with the actions for the environment replicas, and then waits until a subsequent observation and a reward are obtained from each of the processes in response to the respective calls.

The system executes a training subgraph to update the values of the parameters of the action selection neural network (step 312).

In particular, the training subgraph includes a node that generates the batch of training tuples, one or more nodes that determine a gradient of a loss function for the reinforcement learning technique for the batch of training tuples, and one or more nodes that perform a backward pass through the action selection neural network to update the network parameter values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training an action selection neural network to select actions to be performed by an agent interacting with an environment, wherein the action selection neural network has a plurality of network parameters and is configured to receive an input observation and to process the input observation in accordance with the network parameters to generate a network output that defines an action to be performed by the agent in response to the input observation, wherein the training is performed by processing a computation graph comprising nodes representing neural network operations and edges representing flow of input and output data of the neural network operations, wherein the computation graph includes an inference subgraph and a training subgraph, and wherein the method comprises, for each of a plurality of steps:

obtaining a plurality of current observations, each current observation characterizing a current state of a respective one of a plurality of environment replicas, wherein each environment replica is maintained by a separate process;

generating an observation batch as a single tensor that combines the plurality of current observations of the plurality of environment replicas maintained by the separate processes;

processing the current observations of the plurality of environment replicas in the single tensor in parallel using the action selection neural network in accordance with current values of the network parameters to generate an action batch that includes, for each environment replica, a respective action to be performed by the agent in response to the current observation characterizing the current state of the environment replica, wherein the processing comprises executing the inference subgraph to perform batched inference in parallel for the action selection neural network on the current observations in the single tensor to generate a respective network output for each current observation and select a respective action from the respective network output;

generating a transition tuple batch comprising a respective transition tuple for each of the environment replicas, wherein the transition tuple batch is generated by available processors of a plurality of first processors and using the separate processes in parallel, wherein the generating the transition tuple batch comprises constraining each respective sperate process to progress each respective environment replica with a single transition step using the respective action specified in the action batch, the respective transition tuple for each environment replica comprising:

(i) a subsequent observation characterizing a subsequent state that the environment replica transitioned into as a result of the agent performing the respective action in the action batch for the environment replica, and (ii) a reward generated as a result of the environment replica transitioning into the subsequent state; and training the action selection neural network by a plurality of second processors, on the transition tuple batch to update the current values of the network parameters using a reinforcement learning technique, the training comprising executing the training subgraph using the plurality of second processors, wherein the training subgraph takes as input the transition tuple batch and the current values of the network parameters and applies the reinforcement learning technique to the training tuples in the batch to generate updated values of the network parameters.

2. The method of claim 1, wherein the generating the transition tuple batch comprising the respective transition tuple for each of the environment replicas comprises:

providing the respective action in the action batch to the separate process that maintains the environment replica corresponding to the respective action to cause the environment replica to transition into the subsequent state in parallel; and obtaining, from each of the separate processes, the subsequent observation and the reward for the environment replica maintained inside of the separate process.

3. The method of claim 2, wherein the generating the transition tuple batch further comprises:

after the subsequent observation and the reward have been obtained from all of the separate processes, generating the transition tuple batch from data obtained from the separate processes.

4. The method of claim 1, wherein the generating the transition tuple batch comprising the respective transition tuple for each of the environment replicas comprises:

issuing respective calls in parallel to each of the separate processes with the actions for the environment replicas;

waiting until a subsequent observation and a reward are obtained from each of the separate processes in response to the respective calls; and after determining that the subsequent observation and the reward have been obtained from each of the separate processes, generating the transition tuple batch using the obtained subsequent observations and rewards.

5. The method of claim 1, wherein the reinforcement learning technique is a proximal policy optimization (PPO) algorithm.

6. The method of claim 1, wherein the training the action selection neural network is performed prior to the progressing of each respective environment replica is performed again in the next single transition step.

7. The method of claim 1, wherein the generating the transition tuple batch and training the action selection neural network are performed in parallel.

8. A system comprising one or more computers and one or more storage devices storing instructions that when executed by the one or more computers cause the one or more computers to perform operations for training an action selection neural network to select actions to be performed by an agent interacting with an environment, wherein the action selection neural network has a plurality of network parameters and is configured to receive an input observation and to process the input observation in accordance with the network parameters to generate a network output that defines an action to be performed by the agent in response to the input observation, wherein the training is performed by processing a computation graph comprising nodes representing neural network operations and edges representing flow of input and output data of the neural network operations, wherein the computation graph includes an inference subgraph and a training subgraph, and wherein the operations comprise, for each of a plurality of steps:

obtaining a plurality of current observations, each current observation characterizing a current state of a respective one of a plurality of environment replicas, wherein each environment replica is maintained by a separate process;

generating an observation batch as a single tensor that combines the plurality of current observations of the plurality of environment replicas maintained by the separate processes;

processing the current observations of the plurality of environment replicas in the single tensor in parallel using the action selection neural network in accordance with current values of the network parameters to generate an action batch that includes, for each environment replica, a respective action to be performed by the agent in response to the current observation characterizing the current state of the environment replica, wherein the processing comprises executing the inference subgraph to perform batched inference in parallel for the action selection neural network on the current observations in the single tensor to generate a respective network output for each current observation and select a respective action from the respective network output;

generating a transition tuple batch comprising a respective transition tuple for each of the environment replicas, wherein the transition tuple batch is generated by available processors of a plurality of first processors and using the separate processes in parallel, wherein the generating the transition tuple batch comprises constraining each respective sperate process to progress each respective environment replica with a single transition step using the respective action specified in the action batch, the respective transition tuple for each environment replica comprising:

(i) a subsequent observation characterizing a subsequent state that the environment replica transitioned into as a result of the agent performing the respective action in the action batch for the environment replica, and (ii) a reward generated as a result of the environment replica transitioning into the subsequent state; and training the action selection neural network by a plurality of second processors, on the transition tuple batch to update the current values of the network parameters using a reinforcement learning technique, the training comprising executing the training subgraph using the plurality of second processors, wherein the training subgraph takes as input the transition tuple batch and the current values of the network parameters and applies the reinforcement learning technique to the training tuples in the batch to generate updated values of the network parameters.

9. The system of claim 8, wherein the generating the transition tuple batch comprising the respective transition tuple for each of the environment replicas comprises:

providing the respective action in the action batch to the separate process that maintains the environment replica corresponding to the respective action to cause the environment replica to transition into the subsequent state in parallel; and obtaining, from each of the separate processes, the subsequent observation and the reward for the environment replica maintained inside of the separate process.

10. The system of claim 9, wherein the generating the transition tuple batch further comprises:

after the subsequent observation and the reward have been obtained from all of the separate processes, generating the transition tuple batch from data obtained from the separate processes.

11. The system of claim 8, wherein the generating the transition tuple batch comprising the respective transition tuple for each of the environment replicas comprises:

issuing respective calls in parallel to each of the separate processes with the actions for the environment replicas;

waiting until the subsequent observation and the reward are obtained from each of the separate processes in response to the respective calls; and after determining that a subsequent observation and a reward have been obtained from each of the separate processes, generating the transition tuple batch using the obtained subsequent observations and rewards.

12. The system of claim 8, wherein the reinforcement learning technique is a proximal policy optimization (PPO) algorithm.

13. One or more non-transitory computer-readable storage media storing instructions that when executed by one or more computers cause the one or more computers to perform operations for training an action selection neural network to select actions to be performed by an agent interacting with an environment, wherein the action selection neural network has a plurality of network parameters and is configured to receive an input observation and to process the input observation in accordance with the network parameters to generate a network output that defines an action to be performed by the agent in response to the input observation, wherein the training is performed by processing a computation graph comprising nodes representing neural network operations and edges representing flow of input and output data of the neural network operations, wherein the computation graph includes an inference subgraph and a training subgraph, and wherein the operations comprise, for each of a plurality of steps:

obtaining a plurality of current observations, each current observation characterizing a current state of a respective one of a plurality of environment replicas, wherein each environment replica is maintained by a separate process;

generating an observation batch as a single tensor that combines the plurality of current observations of the plurality of environment replicas maintained by the separate processes;

processing the current observations of the plurality of environment replicas in the single tensor in parallel using the action selection neural network in accordance with current values of the network parameters to generate an action batch that includes, for each environment replica, a respective action to be performed by the agent in response to the current observation characterizing the current state of the environment replica, wherein the processing comprises executing the inference subgraph to perform batched inference in parallel for the action selection neural network on the current observations in the single tensor to generate a respective network output for each current observation and select a respective action from the respective network output;

generating a transition tuple batch comprising a respective transition tuple for each of the environment replicas, wherein the transition tuple batch is generated by available processors of a plurality of first processors and using the separate processes in parallel, wherein the generating the transition tuple batch comprises constraining each respective sperate process to progress each respective environment replica with a single transition step using the respective action specified in the action batch, the respective transition tuple for each environment replica comprising:

(i) a subsequent observation characterizing a subsequent state that the environment replica transitioned into as a result of the agent performing the respective action in the action batch for the environment replica, and (ii) a reward generated as a result of the environment replica transitioning into the subsequent state; and training the action selection neural network by a plurality of second processors, on the transition tuple batch to update the current values of the network parameters using a reinforcement learning technique, the training comprising executing the training subgraph using the plurality of second processors, wherein the training subgraph takes as input the transition tuple batch and the current values of the network parameters and applies the reinforcement learning technique to the training tuples in the batch to generate updated values of the network parameters.

14. The non-transitory computer-readable storage media of claim 13, wherein the generating the transition tuple batch comprising the respective transition tuple for each of the environment replicas comprises:

providing the respective action in the action batch to the separate process that maintains the environment replica corresponding to the respective action to cause the environment replica to transition into the subsequent state in parallel; and obtaining, from each of the separate processes, the subsequent observation and the reward for the environment replica maintained inside of the separate process.

15. The non-transitory computer-readable storage media of claim 14, wherein the generating the transition tuple batch further comprises:

after the subsequent observation and the reward have been obtained from all of the separate processes, generating the transition tuple batch from data obtained from the separate processes.

* * * * *